United States Patent
Maeda et al.

(10) Patent No.: US 6,714,510 B2
(45) Date of Patent: Mar. 30, 2004

(54) INFORMATION RECORDING MEDIUM INCLUDING LAYER OF UNIFORM THICKNESS AND REPRODUCING DEVICE THEREOF

(75) Inventors: Takanori Maeda, Saitama (JP); Masayuki Iwasaki, Saitama (JP)

(73) Assignee: Pioneer Corporation, Tokyo (JP)

( * ) Notice: Subject to any disclaimer, the term of this patent is extended or adjusted under 35 U.S.C. 154(b) by 406 days.

(21) Appl. No.: 09/799,557

(22) Filed: Mar. 7, 2001

(65) Prior Publication Data

US 2001/0022764 A1 Sep. 20, 2001

(30) Foreign Application Priority Data

Mar. 7, 2000 (JP) ....................................... P.2000-061523

(51) Int. Cl.⁷ ................................................ G11B 7/00

(52) U.S. Cl. ........................................ 369/288; 369/283
(58) Field of Search ........................... 369/47.14, 47.17, 369/47.18, 53.35, 283, 286, 288

(56) References Cited

U.S. PATENT DOCUMENTS 4,740,947 A 4/1988 Ohta et al.

FOREIGN PATENT DOCUMENTS

| EP | 0 268 352 A1 | 5/1988 |
| EP | 0 706 178 A2 | 10/1996 |
| EP | 0 867 873 A2 | 9/1998 |

Primary Examiner—Paul W. Huber
(74) Attorney, Agent, or Firm—Sughrue Mion, PLLC (57) ABSTRACT

An information recording medium includes a substrate, and one or a plurality of layers formed on the substrate, wherein at least one of the layers is formed by mixing a base material and a hard material which has a predetermined thickness and determines a predetermined thickness of the layer.

17 Claims, 8 Drawing Sheets

NOISE GENERATION TIME INTERVAL (AVERAGE TIME INTERVAL t1)

FIG. 6B

NOISE GENERATION TIME INTERVAL (AVERAGE TIME INTERVAL t2)

INFORMATION RECORDING MEDIUM INCLUDING LAYER OF UNIFORM THICKNESS AND REPRODUCING DEVICE THEREOF

BACKGROUND OF THE INVENTION

1. Field of the Invention

The present invention generally relates to an information recording medium such as an optical disc, for recording video signals, voice signals, etc., therein. More particularly, the invention relates to a layer structure of an information recording medium in which information is recorded into a plurality of recording layers, which are laminated with intermediate layers being interlayered therebetween. Further, the invention relates to a reproducing device capable of reproducing the recorded information from the information recording medium.

2. Description of the Related Art

In recent years, in the field of the optical disc, how to increase a recording density for each side of the optical disc is under investigation. A double layer DVD having two recording layers is a typical example of such. A layer structure of the double layer DVD is shown in FIG. 9.

Figure 9:
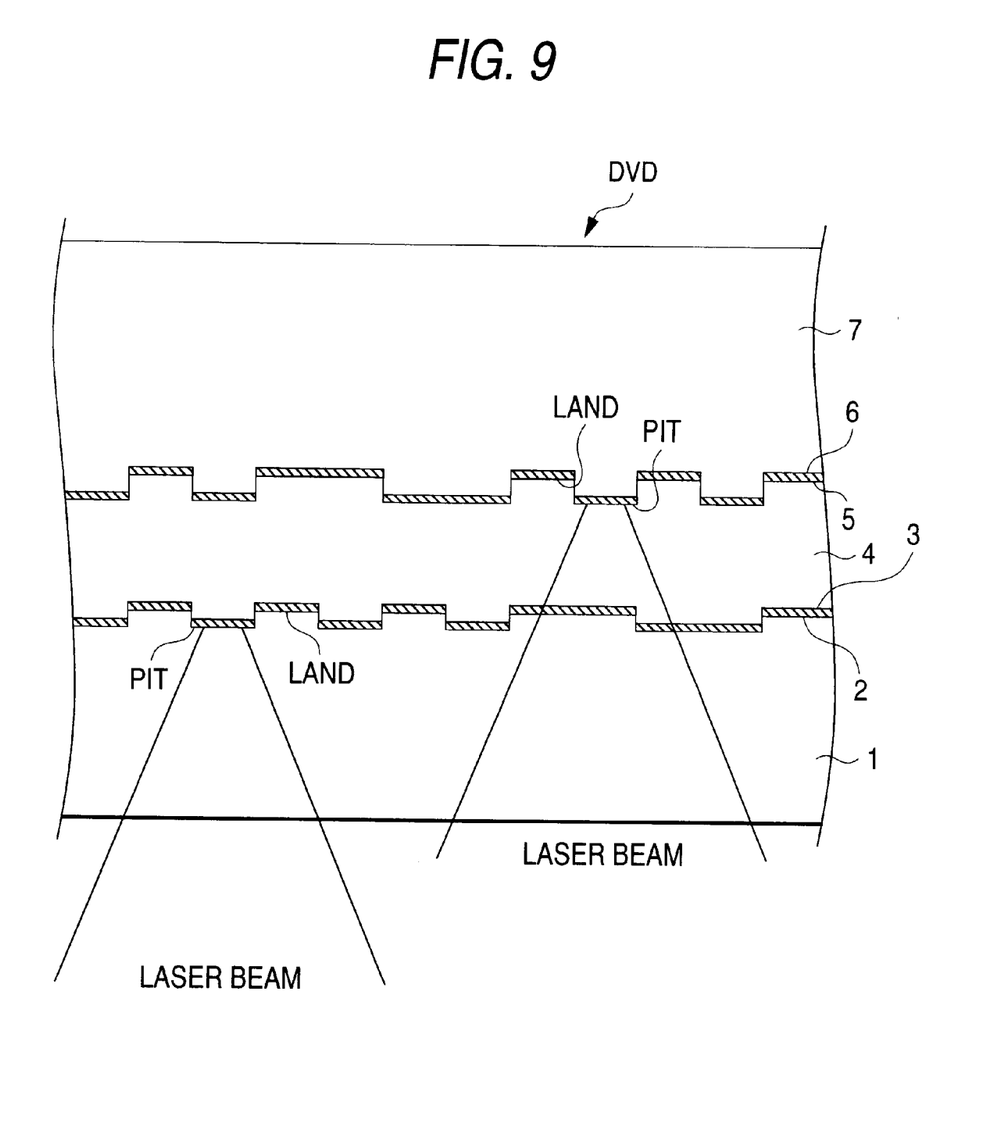
FIG. 9 is a diagram showing an example of a conventional double layer disc as a DVD.

The DVD shown in FIG. 9 is formed with a first substrate 1 having a recording layer 2, a first reflecting layer 3, an intermediate layer 4 having a recording layer 5, a second reflecting layer 6, and a protecting layer 7. In FIG. 9, the first substrate 1 is made of a material permitting light to pass therethrough, such as PC (polycarbonate). The recording layer 2 having a first pit train for information recording is layered on the first substrate 1. The first reflecting layer 3 as an intermediate reflecting layer, which is made of gold (Au) or silicon carbide (SiC), is formed on the recording layer 2. The intermediate layer 4 is layered on the first reflecting layer 3. The intermediate layer 4 is made of photo-setting resin, such as ultraviolet curing acrylic resin, and has the recording layer 5 on the surface thereof, which is opposite to its surface being in contact with the first reflecting layer 3. The recording layer 5 has a second pit train for information recording.

The second reflecting layer 6 is formed on the recording layer 5 of the intermediate layer 4 by deposition process or the like. The second reflecting layer is formed with a reflecting layer made of aluminum (Al), which is higher in reflectivity than the intermediate reflecting layer. The protecting layer 7 of about 600 μm thick and made of resin or the like is layered on the second reflecting layer 6. The protecting layer 7 is formed, for example, in a manner that the surface of the second reflecting layer 6 is coated with resin coating or the like. Pits each having a size corresponding to a wavelength of 650 nm carrying information are spirally or concentrically formed on each recording layer according to a given modulation method.

To reproduce information from the recording layer 2, the first reflecting layer 3 must permit some quantity of a laser beam to transmit therethrough. For this reason, the first reflecting layer 3 is made of a material having some degree of reflectivity and some degree of transmissivity, and is generally formed with a gold (Au) film of about 15 nm thick, or the like.

Information recorded in the double layer disc maybe played back or reproduced by a disc play-back or reproducing device. To play back the information, a laser beam converged by an objective lens, which is contained in a pickup optical system, is irradiated from the first substrate 1 of the rotating DVD toward the upper or lower recording layer. A reflecting light which is reflected by the reflecting layer (or intermediate reflecting film) formed on the recording layer) formed on the recording layer and is optically modulated by pits, grooves or the like, is received again through the objective lens, and converted into an electrical signal, and in this way a readout signal is formed. By using the readout signal, the information born by the recording layers is reproduced. Accordingly, when the DVD whose recording layer consists of double layers is compared with the DVD whose recording layer consists of a single layer, the former may have an increased recording capacity per one disc.

As described above, in the optical disc, its recording capacity per disc may be increased as the number of the recording layers increases. However, with increase of the number of the recording layers, the number of the intermediate layers also increases. To read information from a multi-layer disc having a number of recording layers, a laser beam passes through the intermediate layers. By the intermediate layers, a spherical aberration tends to occur. A reflecting light coming from the recording layer located far from the first substrate 1 contains a great spherical aberration component. This results in incorrect reproduction of information.

To lessen the adverse effect on the reflecting lights from the respective intermediate layers by the spherical aberration, each intermediate layer must be formed so as to have a thickness as thin as possible.

One of possible solutions to the above problem is to manufacture the multi-layer disc whose intermediate layer interlayered between the adjacent recording layers is extremely thin, e.g., about 3 μm. Such a disc allows information to exactly be read out of each recording layer without giving rise to an interlayer cross talk when the method disclosed in JP-A-11-242824 is used.

In actually manufacturing the multi-layer disc, a transparent sheet of a fixed thickness is sandwiched between the recording layers, and those layers are bonded together, whereby an intermediate layer is formed between the recording layers. And a space between the adjacent recording layers (interlayer distance) is determined by a thickness of the intermediate layer. Only the sum of the thickness of the transparent sheet and the bonding layer for bonding the recording layers reaches the target interlayer distance (e.g., 3 μm). Accordingly, it is difficult to manufacture a multi-layer disc having a small and stable space between the recording layers.

SUMMARY OF THE INVENTION

From the above background reasons, the present invention is to provide a multi-layer information recording medium in which a layer, e.g., an intermediate layer, formed between a multiple of recording layers is stably formed having a uniform predetermined height over the entire area of the layer, and a reproducing device which is capable of faithfully reproducing information from the recording layers.

To achieve the above object, there is provided a first information recording medium which comprises a substrate, and one or a plurality of layers formed on the substrate, wherein at least one of the layers is formed by mixing a base material and a hard material which has a predetermined thickness and determines a predetermined thickness of the layer.

In the first recording medium, the hard material of at least one of the layers is sandwiched between it and the adjacent substrate and a reflecting layer of another layer, so that the layer is stably formed while having a thickness equal to the height of the hard material over the entire layer.

In a second information recording medium, which depends from the first recording medium, the hard material contains spherical particles each of which has a predetermined outside diameter.

In the second recording medium, the hard material of the layer consisting of the hard material and the base material is sandwiched between it and the adjacent substrate and a reflecting layer of another layer, so that the layer is stably formed while having a thickness equal to the outside diameter of each particle contained in the hard material over the entire layer.

In a third information recording medium, which depends from the first recording medium, the hard material contains particles each configured like a column to have an outside diameter of a predetermined height.

In the third recording medium, the side face of a column-like material of the hard material of the layer consisting of the hard material and the base material is sandwiched between it and the adjacent layer or the reflecting layer of another layer, so that the layer is stably formed while having a thickness equal to the outside diameter of the column-like material over the entire layer.

In a fourth information recording medium, which depends from any of the first to third recording media, the hard material and the base material each consist of a transparent medium.

In the fourth recording medium, the layer consisting of the hard material and the base material is transparent and has a predetermined thickness over the entire layer. Accordingly, even when a pickup of the reproduction device projects a laser beam converted by an objective lens to the recording layer through the substrate and the layer, it can receives a sufficient amount of reflecting light from the recording layer. Therefore, it can stably generate a readout signal based on the information read out of the information recording layer.

In a fifth information recording medium, which depends from any of the first to fourth recording media, the layer consisting of the hard material and the base material is an intermediate layer sandwiched between two recording layers.

In the fifth recording medium, the hard material of a predetermined height, which is contained in the intermediate layer, is formed while being sandwiched between the two recording layers. Accordingly, the intermediate layer is stably formed having a predetermined thickness over the entire layer.

In a sixth information recording medium, which depends from any of the first to fifth recording media, the hard material consists of a medium whose refractive index is substantially equal to that of the base material.

In the sixth recording medium, the layer consisting of the hard material and the base material is uniform over the entire layer in refractive index and thickness. When the pickup of the reproduction device in use with the recording medium projects a laser beam converged by an objective lens to the information recording layer through the substrate and the layer, receives reflecting light from the recording layer, and generates a readout signal based on the reflecting light, the signal representing information readout of the recording layer, the laser beam passes through the layer having a uniform refractive index. Accordingly, the reflecting light received does not contain noise caused by different refractive indices, and hence it stably and exactly generates the readout signal representative of the information read out of the recording layer.

In a seventh information recording medium, which depends from any of the first to fifth recording media, the hard material consists of a medium whose refractive index is different from that of the base material, and is uniformly distributed in the base material, to thereby form the layer.

In the seventh recording medium, when the pickup of the reproduction device in use with the recording medium projects a laser beam converged by an objective lens, for example, to the information recording layer through the substrate of the recording medium rotating at a predetermined velocity and the layer, receives reflecting light from the recording layer, and generates a readout signal based on the reflecting light, the signal representing information readout of the recording layer, the laser beam of the pickup successively irradiates the hard material whose refractive index is different from that of the base material. Accordingly, noise is generated at the timings that the laser beam passes through the hard material. The noise generation timing is proportional to a radial position of the pickup engaging in reading information from the recording layer. Therefore, one can know the present radial position of the pickup in a manner that the reproduction device detects an average noise generation period in the readout signal.

In an eighth information recording medium, which depends from any of the first to fifth recording media, the hard material consists of a medium whose refractive index is different from that of the base material, and a mixing ratio at which the hard material is mixed into the base material is selected to be within an error correction ability of an error correction portion contained in a reproduction device which optically reads out information from the information recording medium and reproduces the same.

In the eighth recording medium, when the reproduction device optically reads out information from the information recording layer through light passing through the layer containing the hard material whose refractive index is different from that of the base material, even when the operation of reading out the recording information by the reading means is interrupted by the hard material, and the readout signal is consequently missed thereat, the error correction portion satisfactorily carries out an error correction process on the readout signal suffering from the missing, whereby the recorded information is reproduced without any missing of the signal.

A ninth reproduction device reproduces information from the eighth information recording medium, and comprises:
  reading means for reading information from the information recording medium and generating a readout signal; and
  a digital demodulator for digitally demodulating the readout signal by a predetermined method and correcting an error contained in the readout signal by an error correction portion contained therein, to thereby generate coded data based on the readout signal;
  wherein even when the operation of reading out the recording information by the reading means is interrupted by the hard material, and the readout signal is consequently missed thereat, the error correction portion carries out an error correction process on the readout signal suffering from the missing, whereby the coded data corresponding to the readout signal is reproduced without any missing of the signal.

In the ninth recording medium, even when the operation of reading out the recording information by the reading means is interrupted by the hard material during the operation of reading out information from the information recording layer by the reading means, and the readout signal is consequently missed thereat, the error correction portion of the digital demodulator satisfactorily carries out an error correction process on the readout signal suffering from the missing, whereby the coded data corresponding to the readout signal is reproduced without any missing of the signal. Therefore, a reliable reproduction of the recording signal is ensured.

DETAILED DESCRIPTION OF THE PREFERRED EMBODIMENTS

Now, the preferred embodiments of the present invention will be described with reference to the accompanying drawings.

Figure 1:
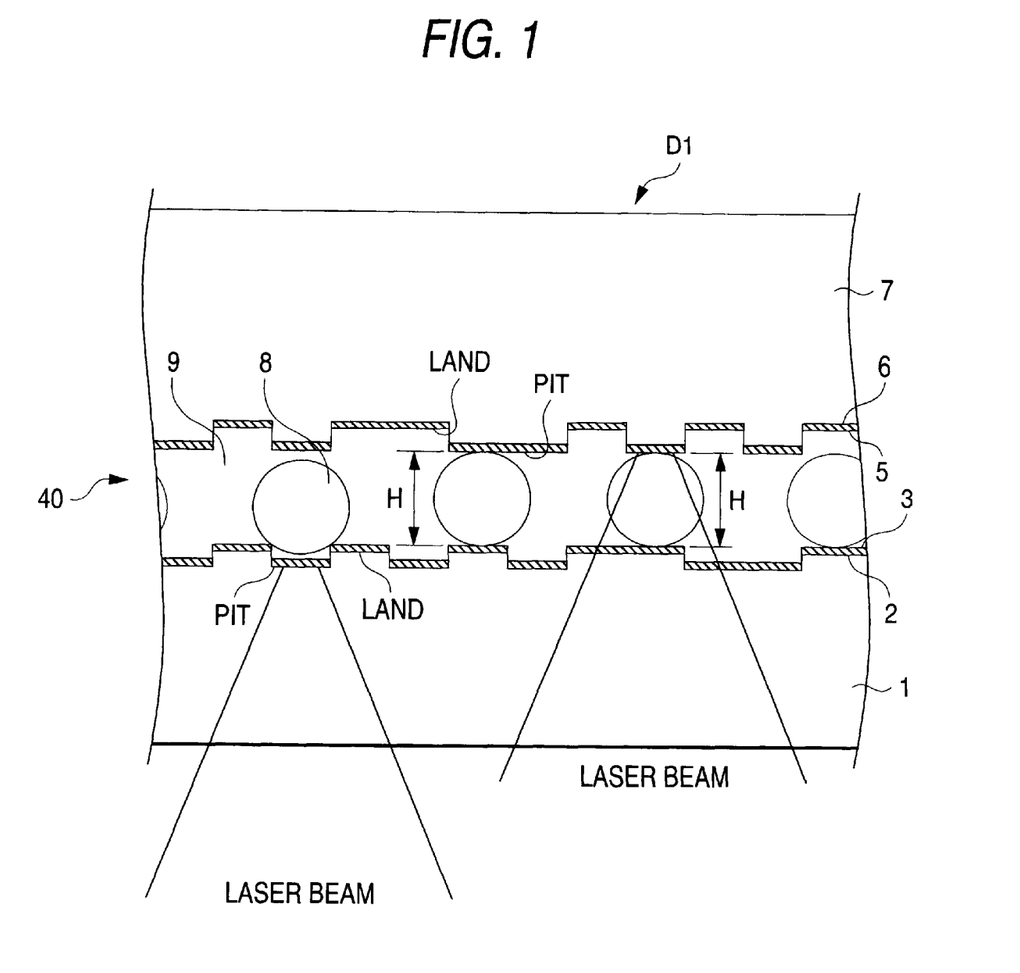
FIG. 1 is a cross sectional view showing a major portion of an optical disc D1 as viewed in the radial direction whose vector passes through the center of rotation of the optical disc, the optical disc D1 being an information recording medium and constituting a first embodiment of the invention.

FIG. 1 is a cross sectional view showing a major portion of an optical disc D1 as viewed in the radial direction whose vector passes through the center of rotation of the optical disc, the optical disc D1 being an information recording medium and constituting a first embodiment of the invention. In FIG. 1, like and equivalent portions are designated by like reference numerals used in the background description (FIG. 9). The optical disc D1 in the first embodiment, as shown in FIG. 1, is formed with a first substrate 1 with a recording layer 2, a first reflecting layer 3, an intermediate layer 40 with a recording layer 5, a second reflecting layer 6, and a protecting layer 7. A major difference of the optical disc of the invention from the conventional disc resides in the intermediate layer 40. Accordingly, the intermediate layer 40 of the first embodiment will be described hereunder in detail.

The intermediate layer 40 in the first embodiment is formed to have a predetermined thickness by mixing a hard material 8 serving as a spacer material and a base material 9 in a method to be described later. The hard material 8 is transparent and has a predetermined refractive index, and serves as a spacer. The base material 9 consulting of a transparent medium whose refractive index is substantially equal to that of the hard material 8. That is, the intermediate layer 40 is a transparent layer consisting of a transparent material and having a predetermined thickness, and being sandwiched between those two recording layers 2 and 5.

The hard material 8 and the base material 9, which form the intermediate layer 40, will be described in detail.

FIGS. 2A to 2F are diagrams showing some geometrical configurations of the hard material 8.

Figure 2A:
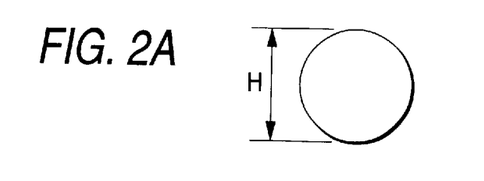
FIGS. 2A to 2F are diagrams showing typical examples of particles contained in a hard material.
Figure 2B:
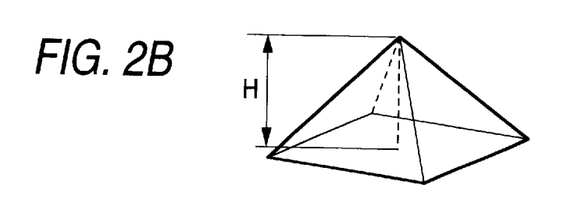
Figure 2C:
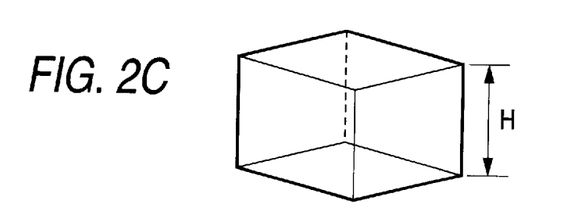
Figure 2D:
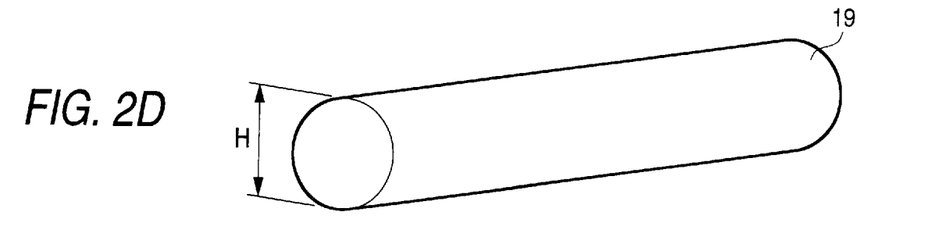
Figure 2E:
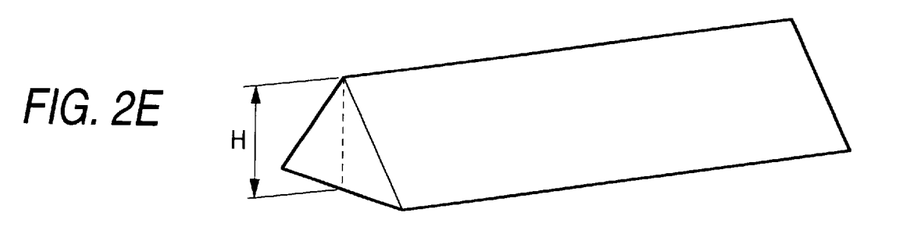
Figure 2F:
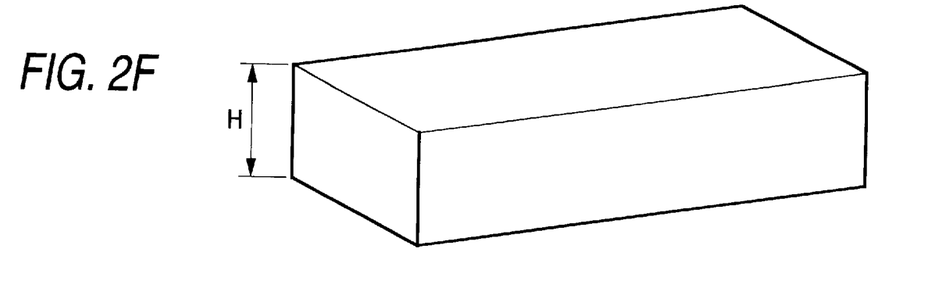

The hard material 8, as shown in FIG. 2A, contains fine spherical particles each having an outside diameter H. In the embodiment, the hard material 8 contains transparent, polystyrene spherical particles each having an outside diameter H, or a predetermined height H of 3 $\mu$m±0.1 $\mu$m, and a refractive index of 1.5±0.1. The hard material 8 may also be any of materials taking geometric configurations shown in FIGS. 2B and 2C. Materials containing fine particles each configured like a column to have a predetermined height H as shown in FIGS. 2D, 2E and 2F may be used for the hard material. A specific example of it is a glass fiber 19 which is a transparent cylindrical member having a predetermined refractive index. In this case, the outside diameter of the glass fiber determines a thickness of the spacer layer.

Then, the base material 9 as shown in FIG. 1, is made of transparent, ultraviolet curing resin which has a refractive index, e.g., 1.5±0.1, equal to that of the hard material 8. The hard material 8 is mixed into the base material 9 at a predetermined mixing ratio, to thereby form the intermediate layer 40.

Figure 3:
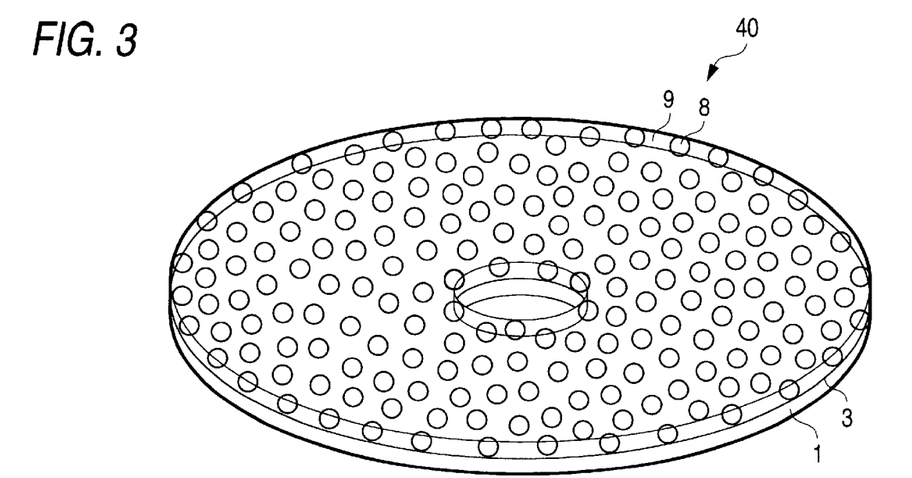
FIG. 3 is a diagram showing a model of a spacer layer layered on a first reflecting layer vapor deposited on a first substrate of the optical disc D1.

FIG. 3 is a view showing in a model form the intermediate layer 40 layered on the first reflecting layer 3, which is vapor deposited on the first substrate 1 of the optical disc D1. In the intermediate layer of FIG. 3, the hard material 8 consists of spherical particles as shown in FIG. 2A.

The intermediate layer 40 is formed in the following manner. The hard material 8 is mixed into the base material 9 before it is hardened so that spherical particles of the hard material 8 are substantially uniformly distributed in the base material 9. The resultant material is deaerated and coating onto the first reflecting layer 3 vapor deposited on the first substrate 1. A stamper which is used for transferring pit trains of the recording layer 5, is superimposed on and pressed against the resultant structure. The structure is then cured by ultraviolet rays, and then the stamper is removed from the structure. In this way, the intermediate layer is formed such that the intermediate layer is laminated on the first reflecting layer 3 (FIG. 3).

As a result, those particles of the hard material 8 are substantially uniformly distributed in the intermediate layer 40. Accordingly, the particles are spaced from one another by substantially equal distance as shown in FIG. 3. Since the structure is stamped with the stamper before the base material 9 is hardened, particles of the hard material 8 having the great number of particles are sandwiched between the land portions of the first reflecting layer 3 and the pit portions of the stamper, which are opposed to the land portions. As a result, the portions of the hard material 8, which are located between the land portions of the first reflecting layer 3 and the pit portions of the stamper located in opposition to the land portions, are layered with a layer space equal to the particle outside diameter H of the hard material 8. In this state, the structure is irradiated with ultraviolet rays to be cured. In this way, an intermediate layer 40 whose upper layer consisting of a recording layer 5 to which the pits of the stamper are transferred, is formed.

The intermediate layer 40 thus formed has a predetermined thickness defined by the outside diameter H of each particle of the hard material 8. Specifically, those portions of the intermediate layer 40, which are located at positions between the land portions of the first reflecting layer 3 and the pit portions of the recording layer 5, are formed each having a thickness H equal to the outside diameter of each particle, which is 3 $\mu$m±0.1 $\mu$m in accuracy.

A mixing ratio of the base material 9 before it is hardened and the hard material 8 is selected such that when the first reflecting layer 3 on the first substrate is coated with the composite material, and the resultant structure is stamped with a stamper for stamping the recording layer 5 on the upper surface of the intermediate layer 40, the spaces among the particles of the hard material 8 are filled with the base material 9, to thereby eliminate spaces from the intermediate layer 40, and that the intermediate layer 40 is kept at a predetermined thickness defined by each particle of the hard material 8.

If at the mixing ratio mentioned above, a number of the particles of the hard material 8 of the intermediate layer 40 is set at the upper limit where the number of the particles is maximized in the thickness or at the lower limit at which the predetermined thickness may be secured, the intermediate layer 40 may be formed stably having a refractive index of 1.5±0.1 in accuracy, substantially equal to a refractive index of either the hard material 8 or the base material 9.

As a result, the intermediate layer 40 is formed having a thin and uniform thickness, which is determined by the outside diameter H of each particle of the hard material 8 and its accuracy. In the intermediate layer 40 thus formed, a refractive index is substantially uniform in value over its entire area within variations of the refractive indices of the hard material 8 and the base material 9 since the refractive index of the hard material 8 is substantially equal to that of the base material 9; it is 1.5±0.1.

In the optical disc D1 thus manufactured, the transparent intermediate layer formed between the recording layer 2 and the recording layer 5 is uniform in thickness over its entire area, and its thickness is thin, 3 $\mu$m as a target value, and its refractive index is also substantially equal over the entire area and is 1.5±0.1.

In the optical disc D1 of the first embodiment, the hard material 8 and the base material 9, which form the intermediate layer 40, are substantially equal in refractive index. However, even if the refractive indices of the materials are different from each other, a thin intermediate layer may be formed. An example of this will be described hereunder as a second embodiment of the present invention.

Figure 4:
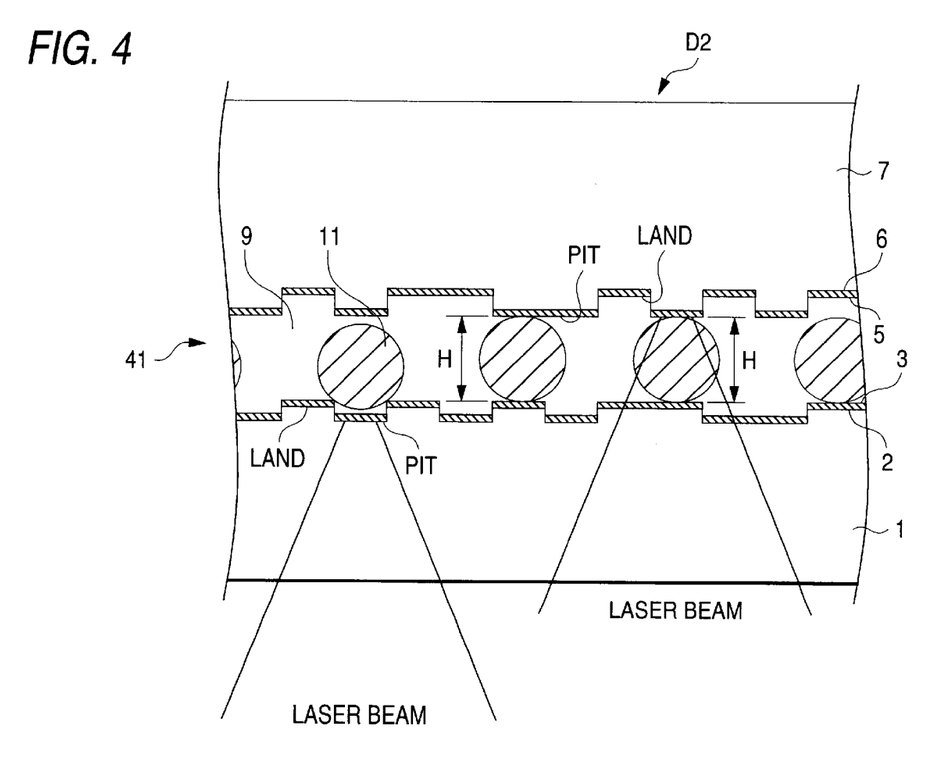
FIG. 4 is a cross sectional view showing a major portion of an optical disc D2 as viewed in the radial direction whose vector passes through the center of rotation of the optical disc, the optical disc D2 being an information recording medium and constituting a second embodiment of the invention.

FIG. 4 is a cross sectional view showing a major portion of an optical disc D2 as viewed in the radial direction whose vector passes through the center of rotation of the optical disc, the optical disc D2 being an information recording medium and constituting a second embodiment of the invention. In FIG. 4, the optical disc D2, like the optical disc D1, is an optical disc of a recording double layer, pits representing information are formed on each recording layer. In the structure of the optical disc D2, like or equivalent portions are designated by like reference numerals used in FIG. 1, for simplicity of explanation.

In the optical disc D2 of FIG. 4 uses an intermediate layer 41 instead of the intermediate layer 40 of the optical disc D1 of FIG. 1. To form the intermediate layer 41, a base material 9, before hardened, and a hard material 11 being transparent and having a refractive index, which is different from 1.5±0.1 of the base material 9, are mixed at predetermined mixing ratio.

The hard material 11, like the hard material 8, consists of fine particles each having a predetermined height. Those particles are transparent polystyrene, spherical particles prepared at such a dimensional accuracy that the outside diameter H, i.e., a predetermined height H, of each particle is 3 $\mu$m±0.1 $\mu$m. A hard material each of which particle takes any of the shapes as shown in FIGS. 2A to 2F may be used, as a matter of course.

The method of forming the intermediate layer 40 of the optical disc D1, which is already described, may be used for a method of forming the intermediate layer 41. Hence, no further description of it will be given here, for simplicity.

The intermediate layer 41 thus formed has a predetermined thickness defined by the outside diameter H of each particle of the hard material 11. Specifically, those portions of the intermediate layer 41, which are located at positions between the land portions of the first reflecting layer 3 and the pit portions of the recording layer 5, are formed each having a thickness H equal to the outside diameter of each particle, which is 3 $\mu$m±0.1 $\mu$m in accuracy.

A mixing ratio of the base material 9 and the hard material 11 before it is hardened is selected such that when the first reflecting layer 3 on the first substrate is coated with the composite material, and the resultant structure is pressed with a second reflecting layer 6 on a second substrate 4, the spaces among the particles of the hard material 11 are filled with the base material 9, whereby no spaces are present in the intermediate layer 41, and that the intermediate layer 41 is formed while keeping the predetermined thickness H by each particle of the hard material 11. Further, the mixing ration does not exceed an error correction ability of an error correction portion 203, which is contained in a reproduction device S1 to be described, which optically reads information from the optical disc D2 by means of a pick-up device and reproduces the readout one.

The optical discs D1 and D2 are thus manufactured, and information recorded in the recording layer of each disc is reproduced by the reproduction device S1 to be described hereunder.

The reproduction device S1 will be described.

Figure 5:
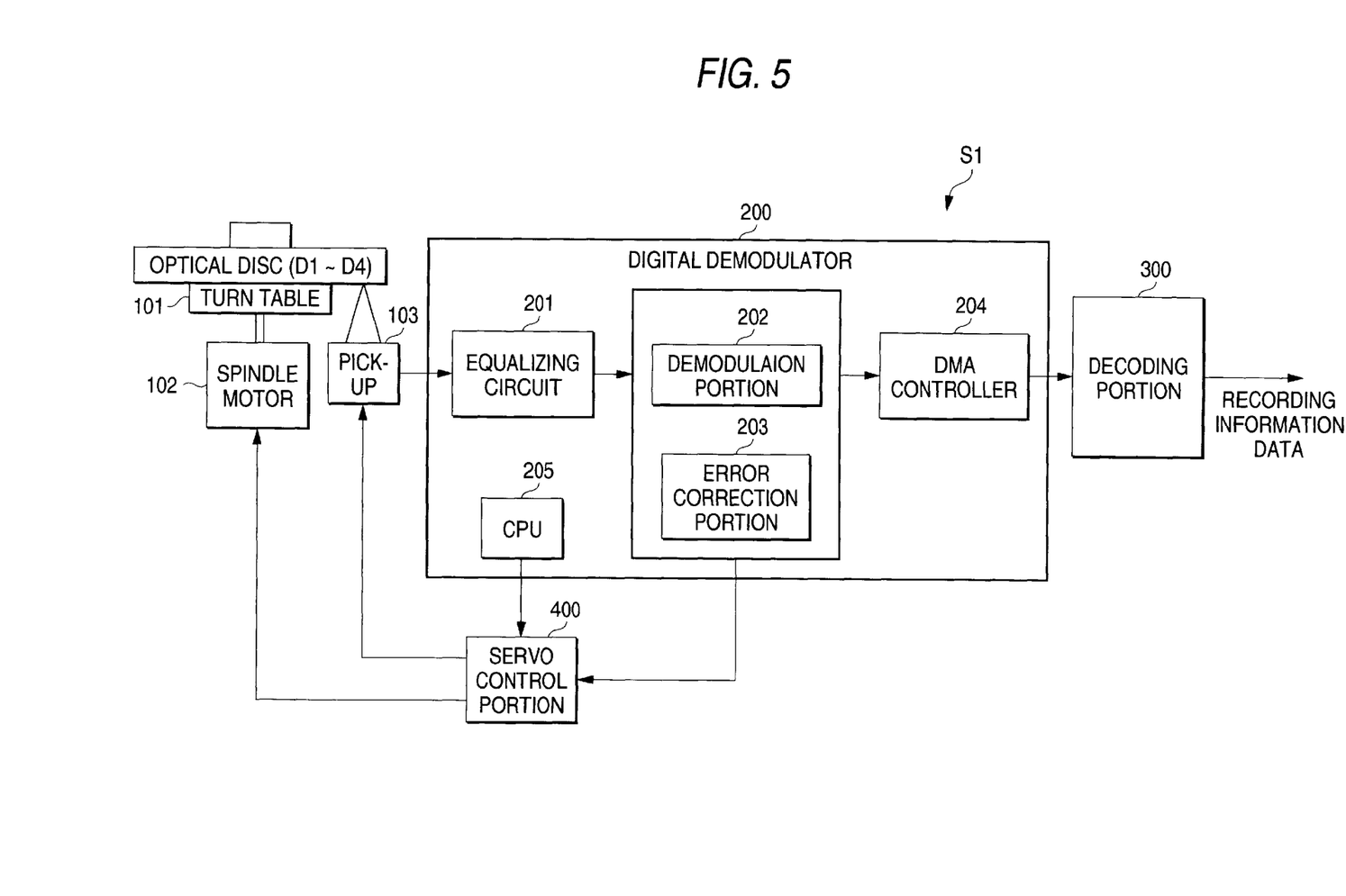
FIG. 5 is a block diagram showing a reproduction device S1.

FIG. 5 is a block diagram showing a reproduction device S1 for reproducing or playing back information from an optical disc as a recording medium, which is constructed according to the present invention. As shown, the reproduction device S1 is generally made up of a spindle motor 102, a pickup 103, a digital demodulator 200, a decoding portion 300 and a servo control portion 400. The spindle motor 102 rotates an optical disc D1 (or D2) on a turntable 101. The pickup 103 receives a light reflected by each recording layer of the optical disc when a laser beam, which is converged by an objective lens, is irradiated onto the optical disc, and generates a readout signal based on it. The digital demodulator 200 generates coded data based on the readout signal. The decoding portion 300 generates recording information data based on the coded data. The servo control portion 400 controls the pickup and the spindle motor 102 in accordance with a control signal output from the digital demodulator.

In the reproduction device S1, when a command is issued to reproduce information from one of the upper and lower recording layers of the optical disc, the spindle motor 102 which pivotally supports the turntable 101 is driven to turn under control of the servo control portion 400. Then, the optical disc D1 placed on the turntable 101 is turned together with the turntable 101 at a predetermined speed. Thereafter, in accordance with a control signal from the servo control portion 400, which is under control of a CPU 205, the pickup 103 follows up a pit train, which is to be scanned by the laser beam, on the recording layer of the optical disc D1 (or D2), which is indicated for its information reproduction, successively irradiates the laser beam to the pits of the pit train, and receives a reflecting light beam from the reflecting film on the pits and generates a readout signal. The pickup 103 sends this readout signal to the digital demodulator 200. The pickup 103 of the reproduction device S1 is provided with an objective lens having a large NA, which is suitable for the size of the pit formed on each recording layer of the optical discs D1 and D2.

The digital demodulator 200 wave-shapes the readout signal received by using an equalizing circuit 201. Then, it carries out a digital demodulation process in a predetermined demodulation method by a demodulator portion 202, and an error correction process by the recording layer error correction portion 203, and generates a coded data signal based on a recording information reproduction command. Thereafter, it successively writes the coded data into a main storage, not shown, and transfers the decoded data every data package unit to the decoding portion 300 by using a sequential DMA controller 204. Part of the coded data is sent to the servo control portion 400. The servo control portion 400 controls the operation of following up the pits under scan by the laser beam of the pickup based on the result of computing, by the CPU 205, the coded data successively coming in under control of the control unit, not shown of the reproduction device S1.

The decoding portion 300 carries out a predetermined process of decoding the coded data coming from the digital demodulator 200, and generates decoded data as the result of the decoding. Then, the recording information data containing voice data, visual data and the like are reproduced or played back.

The arrangement of the reproduction device S1 is roughly as described above.

An operation of reproducing information from the optical disc D1 of the first embodiment by using the reproduction device S1 will now be described with reference to FIG. 1 or 5.

A case that the reproduction device S1 reproduces recording information from the recording layer 2 of the optical disc D1 (see the laser beam on the left side in FIG. 1), will be described. A laser beam emitted from the pickup 103 is applied to the optical disc. Then, the pickup receives a reflecting light from the first reflecting layer 3 on the recording layer 2, which is located closer to the upper surface side of the optical disc, while being substantially free from the spherical aberration, through the first substrate 1 which is transparent and has a uniform refractive index, and generates a readout signal. Incidentally, various converging optical systems including the pickup 103 in the reproduction device S1 is designed to as to hardly give rise to the spherical aberration when information is read out from the recording layer 2.

A case that the reproduction device S1 reproduces recording information from the recording layer 5 of the optical disc D1 (see the laser beam on the left side in FIG. 1), will be described. A refractive index of the intermediate layer 40 of the optical disc D1 is substantially uniform throughout the entire layer and a uniform, thin thickness H, as already described. Accordingly, the reflecting light little suffers from a spherical aberration caused through the intermediate layer 40 even when a laser beam is irradiated on the optical disc, and the pickup 103 for reading out the recording information from each recording layer reads out a reflecting light from the second reflecting layer 6 on the recording layer 5, which is located closer to the upper surface of the optical disc, through the intermediate layer 40 having a substantially uniform refractive index by using an objective lens having a large NA suitable for the pit size.

The pickup 103 is able to receive a reflecting light from the second reflecting layer 6 on the recording layer 5 in a state that the reflecting light hardly suffers from the spherical aberration. Therefore, it is able to generate a readout signal, which is optically modulated exactly by the pit train under scanning on the recording layer 5. Thus, the pickup 103 can exactly read out information represented by the pit train on each recording layer of the optical disc D1, without carrying out optical correction, e.g., the spherical aberration correction for each recording layer.

As a result, the digital demodulator 200 generates coded data exactly corresponding to the recording information based on the readout signal generated, and transfers the generated one to the decoding portion 300 via the DMA controller 204 of the digital demodulator 200. The decoding portion 300 exactly reproduces the recording information based on the coded data received. In this way, the reproduction device S1 is able to faithfully reproduce the recording information from each recording layer of the optical disc D1.

A case where the reproduction device S1 reproduces information from the optical disc D2 of the second embodiment will be described with reference to FIG. 4 or 5.

A case that the reproduction device S1 reproduces recording information from the recording layer 2 of the optical disc D2 (see the laser beam on the left side in FIG. 4), will be described. As in the case of reproducing the recording information from the recording layer 2 of the optical disc D1, the pickup receives a reflecting light from the first reflecting layer 3, while being substantially free from the spherical aberration.

In a case where the reproduction device S1 reproduces recording information from the recording layer 5 of the optical disc D2 (see the laser beam on the right hand side in FIG. 4), the pickup 103 first sequentially irradiates a laser beam on the individual pits of the pit train to be scanned on the recording layer 5, which is close to the lower surface of the optical disc, through the first substrate 1 and then the intermediate layer 41, and sequentially receives a reflecting light from the second reflecting layer 6 of the pits.

At this time, the following light flow sometimes occurs. A laser beam that the pickup 103 emits toward the pit, while being refracted, passes through the base material 9 and the hard material 11 whose refractive index is different from that of the base material 9. Then, it hits the reflecting film portion located on the pit and is reflected thereat, and passes through the hard material 11 and the base material 9 while being refracted, and is led as a reflecting light to the objective lens of the pickup 103.

A reflecting light from the portion of the second reflecting layer 6, which is located on the pit, when passing through only the base material 9, is configured exactly corresponding to a pit configuration. When the reflecting light passes through the hard material 11, pulsated noise is generated at the timings that it passes through the particles of the hard material 11.

As a result, noise is superimposed on the readout signal at the timing that the laser beam from the pickup 103 passes through each particle. The readout signal containing the noise is supplied to the digital demodulator 200.

Thereafter, the digital demodulator 200 wave-shapes a waveform of a readout signal with noise superimposed thereon by the equalizing circuit 201, and carries out a digital demodulation process in a predetermined demodulation method by the demodulator portion 202, and an error correction process by the recording layer error correction portion 203, and generates a coded data signal based on a recording information reproduction command. Therefore, there is no case that the coded data is generated in a state that some part of the data is missed by the noise component contained in the readout signal. Specifically, a frequency of noise occurrence in the readout signal depends on a mixing ratio of the hard material 11 and the base material 9, which is determined in advance for forming the intermediate layer 41. The mixing ratio of the hard material 11 and the base material 9 is selected to be within a range within which the noise occurrence frequency does not exceed the error correction ability when the coded data is generated by the digital demodulator 200. Therefore, the coded data is generated while being free from the data missing. Accordingly, the digital demodulator 200 generates coded data corresponding to the recording information whose reproduction is instructed in a state that the coded data is free from the data missing, and sends the generated one to the decoding portion 300.

Accordingly, the decoding portion 300 exactly reproduces, by using the coded data, the recording information containing voice data and visual data as specified by the reproduction command, and produces the recording information data being completely free from the data missing.

In reading out information represented by a pit train on the recording layer 5 of the optical disc D2 by the reproduction device S1, even when the laser beam emitted from the pickup, while being refracted, passes through the hard material 11 whose refractive index is different from that of the base material 9 of the hard material 11, is reflected by the reflecting layer, and a readout signal based on the reflecting light contains noise superimposed thereon, the digital demodulator 200 wave-shapes and binarizes the readout signal, and the error correction portion 203 carries out the error correction process. Accordingly, the reproduction device sends to the decoding portion the coded data corresponding to the reproduction-instructed recording information, which does not suffer from the data missing. As a result, the reproduction device S1 exactly reproduces the recording information, such as voice data, visual data and the like, as specified by an instruction of reproducing the information stored in the optical disc D2, without any missing of the recording information.

In a case where the intermediate layer consists of the base material 9 and the hard material 11 whose refractive index is different from that of the base material 9 as of the optical disc D2 of the second embodiment, the present reading position of the pickup 103 as viewed in the disc radial direction can roughly be known in a manner that the pickup 103 detects noise superimposed on a readout signal, which is read out from the optical disc D2 rotating at a fixed velocity. This will be described hereunder.

As already described, to form the intermediate layer 41 of the optical disc D2, the base material 9 before hardened and the hard material 11 whose refractive index is different from that of the base material 9 are mixed at a predetermined mixing ratio, and the composite material is layered at a thickness equal to the outside diameter of each particle of the hard material 11. Accordingly, those particles of the hard material 11 are distributed at a fixed density and uniformly over the entire area of the intermediate layer 41. Therefore, when the pickup 103 of the reproduction device S1 reads out recording information from a pit train under scanning of the optical disc D2 rotating at a predetermined velocity, the pickup 103 produces a readout signal containing information of the pit configurations of the pit train, which the readout signal contains the information missing caused by the particles of the hard material 11, which are superimposed thereon, at a frequency corresponding in average to a density of the particles in the hard material.

When the optical disc D2 rotates at a predetermined velocity, a moving speed of the laser beam from the pickup 103 relative to the pit train on the outer recording track of the optical disc D2 is higher than that of the pit train on the inner recording track. Accordingly, a frequency of noise occurrence in the readout signal produced by the pickup 103 when it reads out information from the recording track is higher than that in the readout signal when it reads out information from the inner recording track. The noise occurrence frequency is proportional to a change of a position from the inner side to the outer side of the disc as viewed in the radial direction of the disc.

Figure 6A:
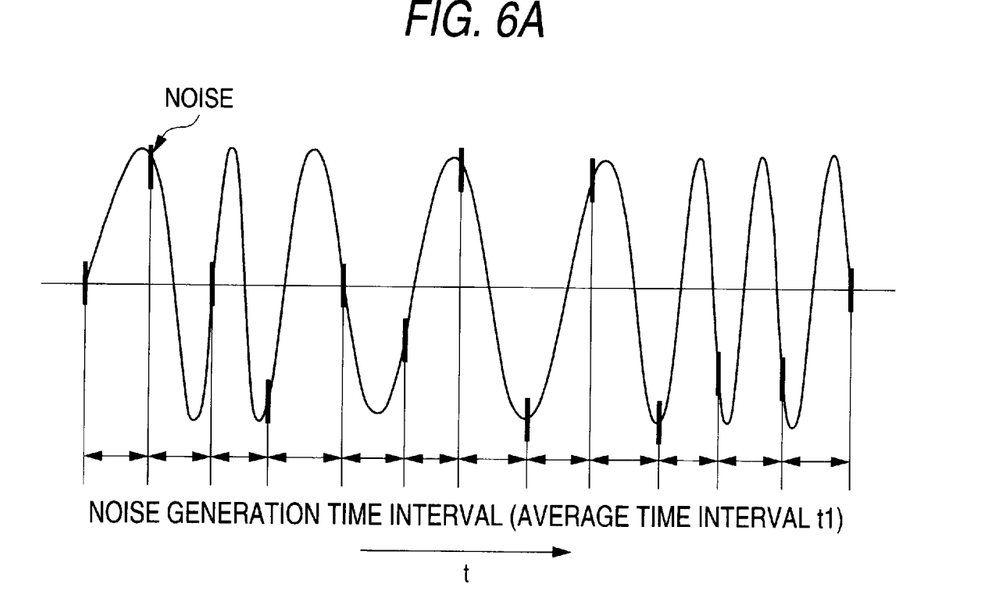
FIGS. 6A and 6B are waveform diagrams showing a readout signal produced by the pickup of the reproduction device S1 when it reads out information from the optical disc D2 rotating at a predetermined velocity.
Figure 6B:
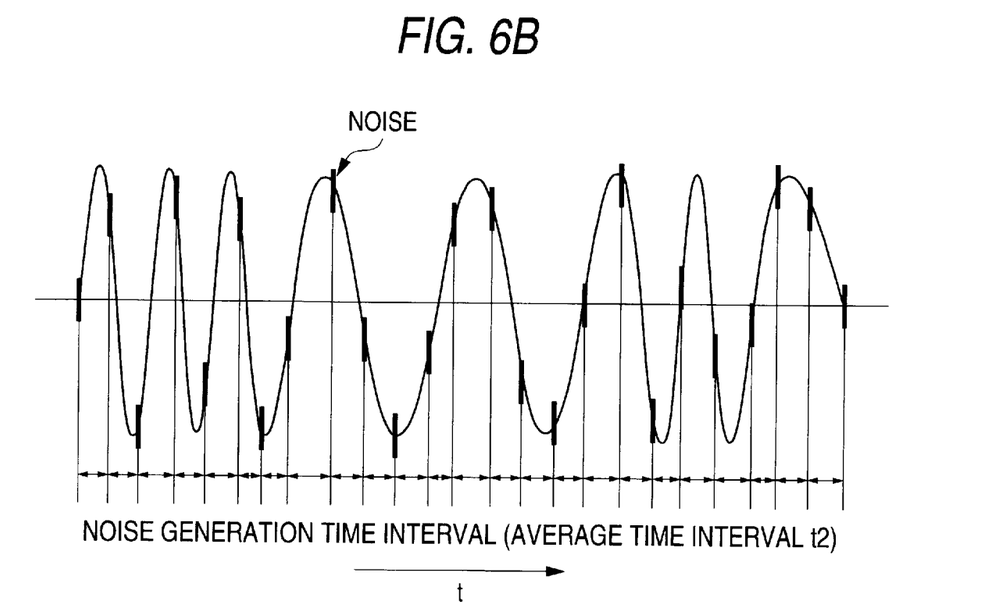

FIG. 6 is a waveform diagram showing a readout signal produced by the pickup 103 of the reproduction device S1 when it reads out information from the optical disc D2 rotating at a predetermined velocity. FIG. 6A shows a waveform of a readout signal produced from the pickup 103 when it reads out information from the inner recording track of the optical disc D2. FIG. 6B shows a waveform of a readout signal produced from the pickup 103 when it reads out information from the outer recording track of the optical disc D2.

At a position on the inner track of the optical disc D2 as viewed in the disc radial direction at which the pickup reads out the information and produces the FIG. 6A readout signal, noises which are generated at relatively long time intervals by the particles of the hard material 11, are superimposed on a waveform generated according to the pit train, and an average time interval t1 among those noises is relatively long. At a position on the outer track of the optical disc D2 as viewed in the disc radial direction at which the pickup reads out the information and produces the FIG. 6B readout signal, noises which are generated at relatively short time intervals by the particles of the hard material 11, are superimposed on a waveform generated according to the pit train, and an average time interval t2 among those noises is relatively short.

Accordingly, when the reproduction device S1 reads out recording information from the recording layer 5 of the optical disc D2 by use of the pickup 103, a control portion of the pickup stores standard occurrence frequencies of noises caused at disc radial positions by the particles of the hard material 11, which noises are to be superimposed on the readout signal, into a memory table of the control portion in accordance with the disc radial positions. Noise occurrence frequencies of noises contained in readout signals produced by the pickup 103 when it reads out information from the rotating optical disc D2, viz., numbers of noises occurring in the readout signal within a predetermined short time, are detected. And the control portion sequentially compares them with the standard occurrence frequencies. The result of the comparison shows the present radial position of the pickup 103 which currently reads the disc-contained information.

Accordingly, when the pickup 103 engages in reading out recording information from a recording track located at a reading position of a radial position of the optical disc D2, and the reproduction device S1 jumps the pickup 103 from the present track to another track, the control portion detects a noise occurrence frequency of a readout signal, which is representative of information that the pickup 103 reads out from the new track, i.e., the track to which the pickup jumped. From the detection result, one can know a reading position of the pickup 103 at the new track as viewed in the disc radial direction.

The first and second embodiments have been described in the forms of the optical disc having such a structure that the intermediate layer formed with a composite material formed by mixing the hard material determining a layer thickness and base material is sandwiched between the two recording layers, and the reproduction device in use with the optical disc. In the optical disc as an information recording medium constructed according to the invention, the composite material formed by mixing the hard material determining a layer thickness and the base material may be used as a protecting layer. If so done, the protecting layer of the optical disc formed is thin, and uniform over its entire area at a thickness being equal to the height of the outside diameter H of the hard material. This technical idea using the composite material for the protecting layer is implemented in the form of a third embodiment of the invention. The third embodiment will be described hereunder.

Figure 7:
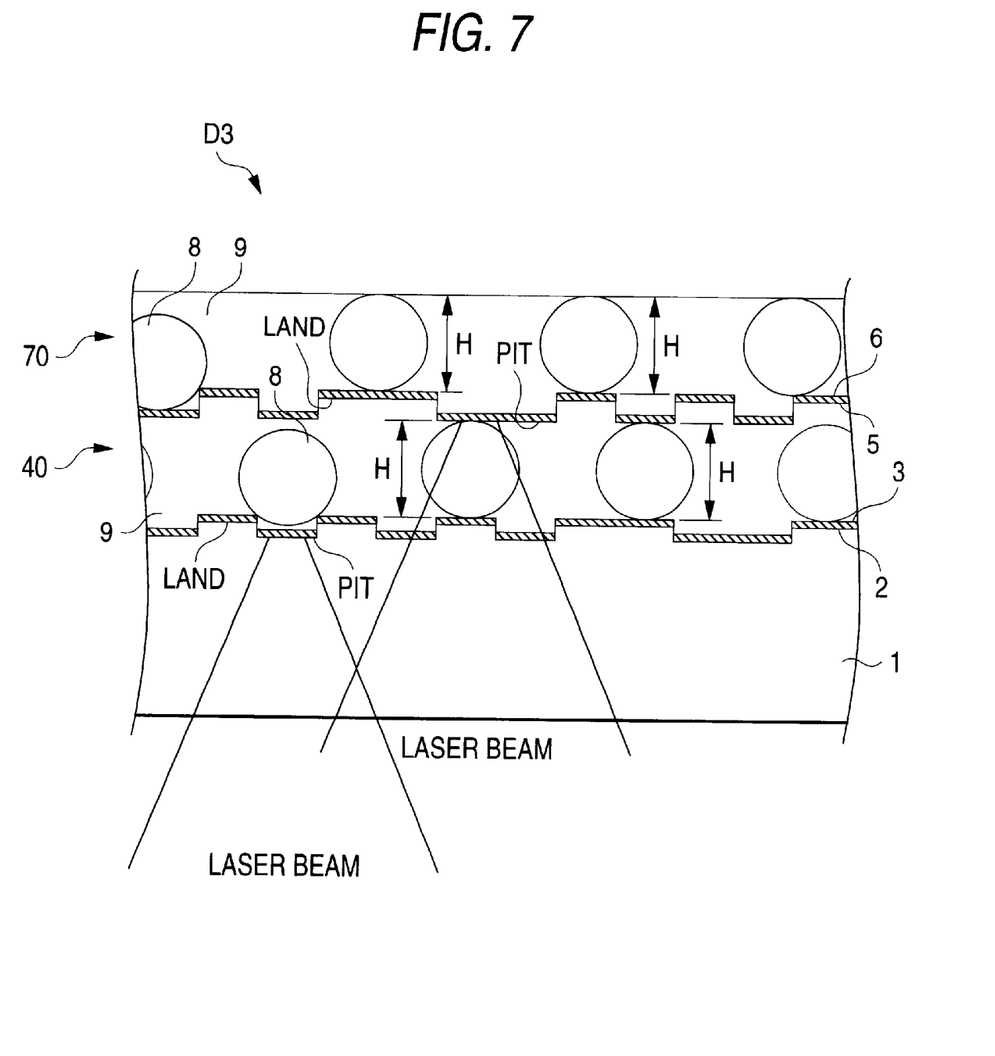
FIG. 7 is a cross sectional view showing a major portion of an optical disc D3 as viewed in the radial direction whose vector passes through the center of rotation of the optical disc, the optical disc D3 being an information recording medium and constituting a third embodiment of the invention.

FIG. 7 is a cross sectional view showing a major portion of an optical disc D3 as viewed in the radial direction whose vector passes through the center of rotation of the optical disc, the optical disc D3 being an information recording medium and constituting a third embodiment of the invention. In FIG. 7, an optical disc D3, like the optical disc D1 already described, is a double layer disc. Pit trains representative of recording information are formed on each recording layer. In the optical disc D3, the portions which are the same as or equivalent to those in the optical disc D1 of FIG. 1 are designated by like reference numerals in FIG. 1.

In the optical disc D3 of FIG. 7, a protecting layer 70 is used in place of the protecting layer 7 in the optical disc D1 of FIGS. 2A to 2F.

The protecting layer 70, like the intermediate layer 40, is formed in a manner that a hard material 8 for determining a layer thickness and a base material 9 are mixed at a predetermined mixing ratio, and the resultant composite material is layered, as a layer having a thickness of 3 $\mu$m±0.1 $\mu$m, on a second reflecting layer 6.

The optical disc D3 has such a structure that a recording layer 2, a first reflecting layer 3, an intermediate layer 40, a recording layer 5, and a second reflecting layer 6 are successively layered on a first substrate 1, and the protecting layer 70 is layered on the second reflecting layer 6.

The protecting layer 70 is formed in the following manner. A hard material 8 is mixed into a base material 9 before it is hardened so that the particles of the hard material 8 are uniformly distributed in the base material 9. The resultant material is deaerated, and layered over the second reflecting layer 6 by coating. A planar glass plate or the like is applied to and pressed against the resultant structure. Subsequently, the structure is irradiated with ultraviolet rays to be hardened, and the glass plate is removed from the structure. In this way, the protecting layer is formed on the second reflecting layer 6. As a result, particles of the hard material 8 containing a great number of particles, which are uniformly distributed on the second reflecting layer 6, are sandwiched between the portions of the second reflecting layer 6, which correspond to the lands of the second reflecting layer 6, and the glass plate which is opposed to the former, and in this state the base material 9 is hardened. The protecting layer 70 thus formed has a thickness equal to the outside diameter H of each particle of the hard material 8. As a result, the protecting layer is uniformly formed at the thickness of 3 $\mu$m±0.1 $\mu$m in accuracy. In the embodiment, the hard material 8 of the protecting layer 70 is the same kind of material as of the intermediate layer 40. If required, a hard material 8 having such a height as to satisfy a thickness of a layer to be formed may be used, as a matter of course.

A case where information is reproduced from the optical disc D3 of the third embodiment by using the reproduction device S1, will be described. In the structure of the optical disc D3, the protecting layer 70 is used in place of the protecting layer 7 in the optical disc D1, which does not affect the reproducing operation of information from the respective recording layers of the optical disc D1 by the reproduction device S1. Accordingly, the reproduction device S1 exactly reproduces information from the recording layer 2 and the recording layer 5 of the optical disc D3, as in the case of reproducing information from the recording layers of the optical disc D1.

Where, as in the optical disc D3, the material formed by mixing a hard material 8 determining a layer thickness into a base material 9 is used for forming a protecting layer, which does not function as a read surface for reading information from the recording layer of the optical disc, any particular restriction is not placed on the refractive indices of the hard material and the base material. In constructing an optical disc, called a both-side multi-layer optical disc, which uses such protecting layers, and information is read out from the recording layers of the optical disc through both sides of the disc, the protecting layer serves also as a read surface for reading information as of the first substrate 1. A laser light by the pickup 103 is made to inevitably to pass through the hard material and the base material of the protecting layer since information is read out from the recording layer located under the protecting layer. Accordingly, it must consist of a medium being transparent, like the intermediate layer 40, and must have a refractive index approximate to that of the intermediate layer of each of the optical discs D1 to D3. This is implemented as a fourth embodiment in the invention, and will be described hereunder.

Figure 8:
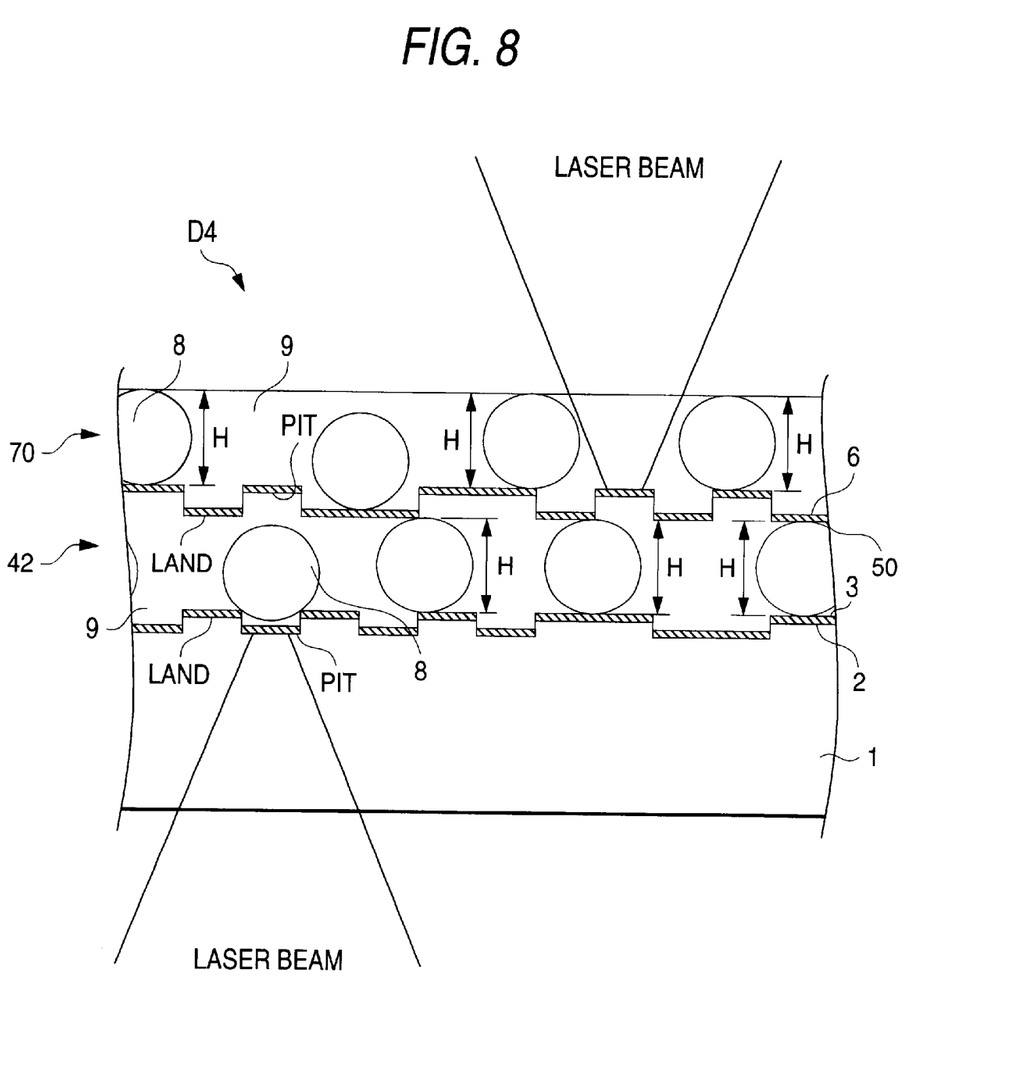
FIG. 8 is a cross sectional view showing a major portion of an optical disc D4 as viewed in the radial direction whose vector passes through the center of rotation of the optical disc, the optical disc D4 being an information recording medium and constituting a fourth embodiment of the invention.

FIG. 8 is a cross sectional view showing a major portion of an optical disc D4 as viewed in the radial direction whose vector passes through the center of rotation of the optical disc, the optical disc D4 being an information recording medium and constituting a fourth embodiment of the invention. In an optical disc D4 of FIG. 8, the recording layer consists of two layers. The optical disc of the embodiment is a called both-side optical disc constructed such that both surfaces of the disc serve as read surfaces for reading information from the recording layers. In the optical disc D4, an intermediate layer 42 is used in place of the intermediate layer 42 of the FIG. 7 optical disc D3, and a recording layer 50 is used in place of the recording layer 5.

In the optical disc D4, to read out information from a recording layer 2 of those two recording layers, the pickup 103 projects a laser beam to the recording layer 2, through the first substrate 1. To read out information from the recording layer 50, the pickup 103 projects a laser beam to the recording layer 50, through the protecting layer 70.

In FIG. 8, the intermediate layer 42, like the intermediate layer 40 of the optical disc D3, is made of a material formed by uniformly mixing a hard material 8 determining a layer thickness and a base material 9 at a predetermined mixing ratio. It is not essential to use a medium being transparent for the intermediate layer of the optical disc D4 of the fourth embodiment.

Pits being representative of information are spirally or concentrically formed in the recording layer 50 by a predetermined modulation system, as in the recording layer 2. As already stated, information is read out from the recording layer 50 in a manner that a laser beam is irradiated onto the recording layer 50 through the protecting layer 70, from the pickup 103. Accordingly, as seen from FIG. 8, pits are raised to the protecting layer 70 with respect to the lands.

The protecting layer 70 of the optical disc D4, like the intermediate layer 40 of the optical disc D3, consists of a transparent medium, and is made of a material formed by uniformly mixing a hard material 8 determining a layer thickness and a base material 9 at a predetermined mixing ratio. A relationship of the refractive index between the hard material 8 and the base material 9, which form the protecting layer 70, resembles that between the hard material and the base material, which form the intermediate layer of each of the optical discs D1 to D3.

In forming the optical disc D4, a recording layer 2 and a first reflecting layer 3 are successively layered on a first substrate 1 as in forming the optical disc D3. Then, an intermediate layer 42 and a recording layer 50 are layered on the first reflecting layer 3 by a method to be described later. Thereafter, a second reflecting layer 6 and a protecting layer 70 are formed on the recording layer 50 by a method similar to that used when the optical disc D3 is formed. Accordingly, with regard to a method of manufacturing the optical disc D4, description will be given about only a method of forming the intermediate layer 42 and the recording layer 50, for simplicity.

To form the intermediate layer 42, a hard material 8 is mixed into a base material 9 before it is hardened so that particles of the hard material 8 are uniformly distributed in the base material 9. The resultant material is deaerated and applied to the first reflecting layer 3 by coating. A stamper for transferring pit trains to the recording layer 50 is placed on and pressed against the resultant structure. Then, the structure is subjected to ultraviolet rays to be hardened, and the stamper is removed. In this way, the intermediate layer is formed on the first reflecting layer 3.

In the intermediate layer 42, as shown in FIG. 8, particles of the hard material 8 containing a great number of particles are sandwiched between the land portions of the first reflecting layer 3 and the land portions of the stamper, which is opposed to the former. As a result, the intermediate layer 42 is uniformly formed at a thickness of 3 $\mu$m±0.1 $\mu$m.

A case where information is reproduced from the optical disc D4 of the fourth embodiment by using the reproduction device S1 will be described.

When the reproduction device S1 reproduces information from the recording layer 2 of the optical disc D4, the pickup 103 reads out information from the recording layer 2 by irradiating a laser light to the recording layer 2 through the first substrate 1, and produces a readout signal, as in the case of reproducing information from the recording layer 2 of the optical disc D3. Accordingly, the reproduction device S1 exactly reproduces the information from the recording layer 2 by using the readout signal.

When the reproduction device S1 reads out recording information from the recording layer 50 of the optical disc D4, the pickup 103 of the reproduction device S1 irradiates a laser light to the recording layer 50 through the protecting layer 70 of the optical disc D4, and generates a readout signal based on a reflecting light from the second reflecting layer 6. And the reproduction device S1 reproduces the recording information of the recording layer 50 by using the readout signal.

For the readout signal that the pickup 103 of the reproduction device S1 generates based on the reflecting light which comes through the protecting layer 70 from the second reflecting layer 6, the reflecting light is almost free from a spherical aberration, which is caused by the thickness of the protecting layer 70, since the protecting layer 70 has a uniform refractive index over the entire layer and a thin thickness H. In this case, when the refractive index of the hard material 8 of the protecting layer 70 is substantially equal to that of the base material 9, the laser light passes through the protecting layer 70 while under going a substantially equal refractive index. Therefore, there is no case where the received reflecting light contains noise caused by different refractive indices in the protecting layer 70. Accordingly, the pickup stably and exactly produces a readout signal based on the information read out from the recording layer 50.

In a case where a relationship of the refractive index between the hard material 8 and the base material 9, which form the protecting layer 70, resembles that between the hard material 11 and the base material 9, which form the intermediate layer 41 of the optical disc D2, as in the case of the readout signal representing the recording information of the recording layer 5 of the optical disc D2, noise caused by different refractive indices of the protecting layer 70 is superimposed on the readout signal. In this case, the reproduction device S1 normally carries out an error correction process by the error correction portion. Accordingly, it faithfully reproduces the recording information without any missing of the information.

While in the fourth embodiment, a laser light is entered into the disc from both sides of the disc, information may be read out of the recording layer 2, through the protecting layer 70. By so doing, the laser light passes through a reduced number of portions when information is read out from one of the recording layers and also from the other recording layer. Reproduction of information from the optical disc is performed while little suffering from the spherical aberration.

While the optical disc of each of the embodiments mentioned above includes two recording layers, it may include three or more number of recording layers.

In each embodiment mentioned above, to form an intermediate layer which is one of the layers forming an information recording medium, a hard material and a base material as a given medium before it is hardened are uniformly mixed so that the hard material is uniformly distributed in the base material. It is not essential that the hard material is mixed into the base material such that it is uniformly distributed over the entire area of the spacer layer.

In this case, when a refractive index of the hard material is different from that of the base material, noise frequently occurs in the readout signal at a location of the spacer layer where the hard material is densely distributed. In such an information recording medium that occurrence of such a phenomenon is predicted in forming the spacer layer, what a designer has to do is to select the mixing ratio of the hard material and the base material to be within the error correction ability of the error correction portion in the digital demodulator of the reproduction device, at a location of the information recording medium at which the hard material is present in the spacer layer at the maximum density.

The error correction process carried out by the error correction portion may be based on any correction algorithm if it is for the binarized coded data.

In each of the optical discs D3 and D4 of the third and fourth embodiments, to form the protecting layer 70, a hard material 8 is mixed into a base material 9 before it is hardened at a predetermined mixing ratio so that the particles of the hard material 8 are uniformly distributed in the base material 9. The resultant material is deaerated, and layered over the second reflecting layer 6 by coating. A planar glass plate or the like is applied to and pressed against the resultant structure. For the protecting layer 70, the planar glass plate may be substituted by any planar member if it is easily peeled from the layer formed of the hard material 8 and the base material 9.

In the embodiments mentioned above, the information recording medium is an optical disc of the type formation is recorded in each recording layer. If required, the information recording medium may be an optical disc of the type in which information may be recorded into each recording layer and the information recorded therein maybe erased. Further, any other recording medium than the optical disc may be used if it has a laminated structure.

As seen from the foregoing description, in the first recording medium, the hard material of at least one of the layers is sandwiched between it and the adjacent substrate and a reflecting layer of another layer, so that the layer is stably formed while having a thickness equal to the height of the hard material over the entire layer.

In the second recording medium, the hard material of the layer consisting of the hard material and the base material is sandwiched between it and the adjacent substrate and a reflecting layer of another layer, so that the layer is stably formed while having a thickness equal to the outside diameter of each particle contained in the hard material over the entire layer.

In the third recording medium, the side face of a column-like material of the hard material of the layer consisting of the hard material and the base material is sandwiched between it and the adjacent layer or the reflecting layer of another layer, so that the layer is stably formed while having a thickness equal to the outside diameter of the column-like material over the entire layer.

In the fourth recording medium, the layer consisting of the hard material and the base material is transparent and has a predetermined thickness over the entire layer. Accordingly, even when a pickup of the reproduction device projects a laser beam converted by an objective lens to the recording layer through the substrate and the layer, it can receives a sufficient amount of reflecting light from the recording layer. Therefore, it can stably generate a readout signal based on the information read out of the information recording layer.

In the fifth recording medium, the hard material of a predetermined height, which is contained in the intermediate layer, is formed while being sandwiched between the two recording layers. Accordingly, the intermediate layer is stably formed having a predetermined thickness over the entire layer.

In the sixth recording medium, the layer consisting of the hard material and the base material is uniform over the entire layer in refractive index and thickness. When the pickup of the reproduction device in use with the recording medium projects a laser beam converged by an objective lens to the information recording layer through the substrate and the layer, receives reflecting light from the recording layer, and generates a readout signal based on the reflecting light, the signal representing information readout of the recording layer, the laser beam passes through the layer having a uniform refractive index. Accordingly, the reflecting light received does not contain noise caused by different refractive indices, and hence it stably and exactly generates the readout signal representative of the information read out of the recording layer.

In the seventh recording medium, when the pickup of the reproduction device in use with the recording medium projects a laser beam converged by an objective lens, for example, to the information recording layer through the substrate of the recording medium rotating at a predetermined velocity and the layer, receives reflecting light from the recording layer, and generates a readout signal based on the reflecting light, the signal representing information readout of the recording layer, the laser beam of the pickup successively irradiates the hard material whose refractive index is different from that of the base material. Accordingly, noise is generated at the timings that the laser beam passes through the hard material. The noise generation timing is proportional to a radial position of the pickup engaging in reading information from the recording layer. Therefore, one can know the present radial position of the pickup in a manner that the reproduction device detects an average noise generation period in the readout signal.

In the eighth recording medium, when the reproduction device optically reads out information from the information recording layer through light passing through the layer containing the hard material whose refractive index is different from that of the base material, even when the operation of reading out the recording information by the reading means is interrupted by the hard material, and the readout signal is consequently missed thereat, the error correction portion satisfactorily carries out an error correction process on the readout signal suffering from the missing, whereby the recorded information is reproduced without any missing of the signal.

In the ninth recording medium, even when the operation of reading out the recording information by the reading means is interrupted by the hard material during the operation of reading out information from the information recording layer by the reading means, and the readout signal is consequently missed thereat, the error correction portion of the digital demodulator satisfactorily carries out an error correction process on the readout signal suffering from the missing, whereby the coded data corresponding to the readout signal is reproduced without any missing of the signal. Therefore, a reliable reproduction of the recording signal is ensured.

What is claimed is:

1. An information recording medium, comprising:
   a substrate; and
   one or a plurality of layers formed on said substrate;
   wherein at least one of said layers if formed by mixing a base material and a hard material which has a predetermined thickness and determines a thickness of said layer, wherein said hard material comprising a medium whose refractive index is not substantially equal to that of said base material.

2. The information recording medium according to claim 1, wherein said hard material contains spherical particles each of which has an outside diameter of a predetermined height.

3. The information recording medium according to claim 1, wherein said hard material contains particles each configured like a column to have an outside diameter of a predetermined height.

4. The information recording medium according to claim 1, wherein each of said hard material and said base material comprises a transparent medium.

5. The information recording medium according to claim 1, wherein said layer comprising said hard material and said base material is an intermediate layer sandwiched between two recording layers.

6. The information recording medium according to claim 1, wherein said hard material is uniformly distributed in said base material, to form said layer.

7. The information recording medium according to claim 1, wherein said hard material contains particles each configured like a square box which has a predetermined height.

8. The information recording medium according to claim 1, wherein said hard material contains particles each configured like a rectangular box which has a predetermined height.

9. The information recording medium according to claim 1, wherein said hard material contains particles each configured like a pyramid which has a predetermined height.

10. The information recording medium according to claim 1, wherein said predetermined thickness of said layer is 3 $\mu m \pm 0.1$ $\mu m$.

11. The information recording medium according to claim 1, wherein said hard material is not uniformly distributed in said base material, to form said layer.

12. The information recording medium according to claim 11, wherein a mixing ratio at which said hard material is mixed into said base material is selected to be within an error correction ability of an error correction portion contained in a reproduction device which optically reads out information from said information recording medium and reproduces the same.

13. The information recording medium according to claim 12, wherein said mixing ratio is selected at a location at which said hard material is at a maximum density.

14. An information recording medium, comprising:
a substrate; and
one or a plurality of layers formed on said substrate;
wherein at least one of said layers is formed by mixing a base material and a hard material which has a predetermined thickness and determines a predetermined thickness of said layer,
wherein said hard material comprises a medium whose refractive index is not substantially equal from that of said base material, and a mixing ratio at which said hard material is mixed into said base material is selected to be within an error correction ability of an error correction portion contained in a reproduction device which optically reads out information from said information recording medium and reproduces the same.

15. A reproduction device or reproducing information from said information recording medium defined in claim 14, said reproduction device comprising:
a reader for reading information from said information recording medium and generating a readout signal; and
a digital demodulator for digitally demodulating said readout signal by a predetermined method and correcting an error contained in said readout signal by an error correction portion contained therein, to generate coded data based on said readout signal;
wherein even when the operation of reading out said recording information by said reader is interrupted by said hard material, and said readout signal is consequently missed thereat, said error correction portion carries out an error correction process on said readout signal suffering from the missing, whereby said coded data corresponding to said readout signal is reproduced without any missing of the signal.

16. An information recording medium, comprising:
a substrate;
one or a plurality of layers formed on said substrate;
wherein at least one of said plurality of layers is an intermediary layer, each intermediary layer disposed between a plurality of recording layers, said intermediary layer comprising a mixture of a base material and a hard material which has a predetermined thickness and determines a predetermined thickness of said intermediary layer,
wherein at least one of said plurality of layers is a protective layer that does not serve as a read surface, said protective layer successively disposed adjacent to only one of said plurality of recording layers, said protective layer comprising a mixture of a base material and a hard material which has a predetermined thickness and determines a predetermined thickness of said protective layer.

17. The information recording medium of claim 16, wherein said protective layer comprising a refractive index that is not substantially equal to said intermediary layer.

* * * * *